US00RE51115E

(19) United States
(12) Reissued Patent
Jackson et al.

(10) Patent Number: US RE51,115 E
(45) Date of Reissued Patent: Nov. 10, 2026

(54) POWER AND CONTROL CABLE FOR HEALTHCARE FACILITIES

(71) Applicant: Southwire Company, LLC, Carrollton, GA (US)

(72) Inventors: Roy Jackson, Carrollton, GA (US); David Brian Mccardel, Marietta, GA (US); Carol Elsen Godfrey, Roswell, GA (US); Richard Temblador, Carrollton, GA (US)

(73) Assignee: Southwire Company, LLC, Carrollton, GA (US)

(21) Appl. No.: 17/341,187

(22) Filed: Jun. 7, 2021

Related U.S. Patent Documents

Reissue of:
(64) Patent No.: 10,347,395
Issued: Jul. 9, 2019
Appl. No.: 15/925,462
Filed: Mar. 19, 2018

U.S. Applications:
(63) Continuation of application No. 15/403,936, filed on Jan. 11, 2017, now Pat. No. 9,959,954.
(Continued)

(51) Int. Cl.
*H01B 11/04* (2006.01)
*H01B 7/17* (2006.01)
(Continued)

(52) U.S. Cl.
CPC ..... *H01B 7/17* (2013.01); *H01B 9/003* (2013.01); *H01B 9/023* (2013.01); *H02G 3/0468* (2013.01); *H01B 9/028* (2013.01)

(58) Field of Classification Search
CPC ..... H01B 7/17; H01B 9/003; H01B 9/023; H01B 9/028; H02G 3/0468
See application file for complete search history.

(56) References Cited

U.S. PATENT DOCUMENTS 4,041,237 A * 8/1977 Stine ..... H01B 9/028 427/501
6,114,632 A 9/2000 Planas, Sr. et al.
(Continued)

FOREIGN PATENT DOCUMENTS

CN 202996345 U 6/2013
CN 203165540 U 8/2013
(Continued)

OTHER PUBLICATIONS

MC_Luminary_HCF_ACF _Cable_System (Year: 2015).*
(Continued)

*Primary Examiner* — Leonardo Andujar
(74) *Attorney, Agent, or Firm* — Oblon, McClelland, Maier & Neustadt, L.L.P.

(57) ABSTRACT

A metal clad cable for healthcare facilities including a first ground conductor, a phase conductor in contact with the first ground conductor, a neutral conductor positioned in contact with the first ground conductor and the phase conductor, a control conductor assembly including a first control conductor and a second control conductor positioned in contact with the phase conductor and the neutral conductor in a valley between the phase conductor and the neutral conductor. The control conductor assembly, the first ground, the phase conductor and the neutral conductor are wrapped in a binder tape forming a core. A second ground conductor is positioned outside the binder tape of the core located away from the control conductor assembly with no contact with the control conductor assembly, and an interlock armor disposed over the core and the second ground conductor, the second ground conductor is maintained in contact with the interlock armor.

19 Claims, 5 Drawing Sheets

Related U.S. Application Data

(60) Provisional application No. 62/277,340, filed on Jan. 11, 2016.

(51) Int. Cl.

| | |
|---|---|
| ***H01B 9/00*** | (2006.01) |
| ***H01B 9/02*** | (2006.01) |
| ***H02G 3/04*** | (2006.01) |

(56) References Cited

U.S. PATENT DOCUMENTS

| | | | | |
|---|---|---|---|---|
| 6,486,395 | B1 | 11/2002 | Temblador | |
| 7,208,684 | B2 | 4/2007 | Fetterolf, Sr. et al. | |
| 8,088,997 | B2 | 1/2012 | Picard et al. | |
| 8,664,532 | B1 | 3/2014 | Herrin | |
| 9,583,923 | B2 | 2/2017 | Westrick, Jr. | |
| 10,002,689 | B2 | 6/2018 | Straniero et al. | |
| 10,361,015 | B1 | 7/2019 | Skidmore et al. | |
| 10,431,353 | B2 | 10/2019 | Straniero et al. | |
| 2003/0008158 | A1* | 1/2003 | Carrus | H01B 7/2825 428/458 |
| 2003/0121694 | A1 | 7/2003 | Grogl | |
| 2011/0297418 | A1 | 12/2011 | Temblador | |
| 2012/0103646 | A1 | 5/2012 | Fox et al. | |
| 2016/0196899 | A1* | 7/2016 | Straniero | H01B 7/18 174/102 R |

FOREIGN PATENT DOCUMENTS

| | | | |
|---|---|---|---|
| CN | 203397732 | U | 1/2014 |
| CN | 203480906 | U | 3/2014 |
| CN | 203812596 | U | 3/2014 |
| CN | 203573721 | U | 4/2014 |
| CN | 103839619 | A | 6/2014 |
| EP | 0677854 | B1 | 10/1997 |

OTHER PUBLICATIONS https://homerepairgeek.com/tips/wire-nut-size-chart.html (Year: 2023).*
National Electrical Code Handbook Eleven Edition International Electrical Code Series (Year: 2008).*
Author: Southwire Company; Title: Red Alert® Plenum Type MC-FPLP Fire Alarm and Control; pp. 1-5; Date: Jan. 24, 2012; Journal: Southwire Company Brochure (Attached).
Author: Underwriters Laboratories Inc.; Title: Certification Requirement Decision for Standard UL 1569, Section 9.4; pp. 1-2; Publication Date: Nov. 13, 2014; Journal: Underwriters Laboratories Inc. Certification Requirement Decision (Attached).
Author: Underwriters Laboratories Inc.; Title: UL 1569 Standard for Safety Metal-Clad Cables (third edition); pp. 1-79; Publication Date: Jan. 6, 2012; Journal: UL Standard for Safety (attached).
Author: Belden Inc.; Title: 2505PTZ Composite—For PTZ Cameras: CCTV + Control + Power; pp. 1-5 ; Publication Date: Jan. 27, 2010; Journal: Belden Product Datasheet (Attached).
Author: AFC Cable Systems; Title: Fire Alarm Control Cable; pp. 1-6; Publication Date: May 11, 2015; Journal: AFC Cable Systems Brochure (Attached).
Author: Encore Wire Corporation; Title: Type MC-SG (Smartground™). Copper Conductor Aluminum Armor THHN/THWN 2 Inners; pp. 1; Publication Date: Oct. 21, 2012; Journal: Encore Wire Corporation Brochure (Attached).
Belden, "Metal-sheathed Communication Cables", NP 265, Total 2 Pages, (2008).
"Standard for Safety Metal-Clad Cables", UL 1569, Third Edition, Dated Aug. 31, 1999, Total 11 Pages, (Jun. 24, 2009).
"Standard for Safety Metal-Clad Cables", UL 1569, Third Edition, Dated Aug. 31, 1999, Total 11 Pages, (Nov. 29, 2006).

* cited by examiner

POWER AND CONTROL CABLE FOR HEALTHCARE FACILITIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

*The present reissue application is a broadening reissue of U.S. Ser. No. 15/925,462, filed Mar. 19, 2018, now U.S. Pat. No. 10,347,395, issued on Jul. 9, 2019, which is a Continuation of U.S. Ser. No. 15/403,936, filed Jan. 11, 2017, now U.S. Pat. No. 9,959,954, issued on May 1, 2018, which claims benefit of provisional application No. 62/277,340, filed March Jan. 11, 2016. The contents of each of these applications are incorporated herein by reference.*

This application is related to U.S. Ser. No. 14/467,937, filed on Aug. 25, 2014. The entire content of the foregoing application is hereby incorporated by reference. This application is also a continuation of, and claims benefit of priority to, prior application Ser. No. 15/403,936, filed Jan. 11, 2017, and claims the benefit of the filing date of U.S. provisional Application No. 62/277,340 filed on Jan. 11, 2016, the entire contents of each of which are hereby incorporated by reference.

BACKGROUND

Field of the Disclosure

This application relates generally to improvements to a power cable. More particularly the present disclosure relates to improvements relating to a power cable having a control and signal wire for general purposes in healthcare facilities.

Description of the Related Art

Typically, any branch circuit wiring that feeds patient care areas have two grounding sources: a metal conduit or a metal sheath of a cable that qualifies as a grounding conductor, and a green insulated grounding conductor.

For health care facilities, three types of branch circuit wiring are popular: a pipe and wire type, a Health Care Facility (HCF) Type AC cable, and Health Care Facility (HCF) Type MC cable. In the pipe and wire type, the pipe is a metal conduit and has a rigid structure, which needs to be bent in the field as needed to achieve the desired routing. In addition, couplings are required to join 10-foot or longer sections. The metal conduit qualifies as a grounding conductor and the addition of a green ground meets a redundant ground requirement. Once the conduit is installed, an electrician manually pulls the wire through the conduit. As such, the installation can be a lengthy and tedious process. Furthermore, the connection or ground path integrity is only as reliable as the couplings that connect the conduit.

On the other hand, the HCF AC or HCF MC cable has wires preinstalled thus there is no need to pull the wire through a conduit. Further, the HCF AC or HCF MC cable is flexible and continuous which eliminates the need for field bending and couplings, Thus, the installation is much faster and less expensive compared to the pipe and wire type.

Further, the ground path is more reliable as there are no couplings that can loosen over time, however the ground path performance is not as good as a copper grounding conductor.

There remains a continuing need to provide improved wiring for health care facilities that offers improvements in grounding performance and reliability, installation productivity, and installed cost.

SUMMARY

According to an embodiment of the present disclosure, there is provided a metal clad cable. The metal clad cable includes a first ground conductor having a first diameter, a phase conductor positioned adjacent to the first ground conductor and in contact with the first ground conductor, a neutral conductor positioned in contact with the first ground conductor and the phase conductor, a control conductor assembly including a first control conductor and a second control conductor, wherein the control conductor assembly is positioned in contact with the phase conductor and the neutral conductor in a valley between the phase conductor and the neutral conductor. The control conductor assembly, the first ground, the phase conductor and the neutral conductor are wrapped in a binder tape forming a core. The metal clad cable further includes a second ground conductor having a second diameter positioned outside the binder tape of the core located relative to the control conductor assembly such that the second ground conductor is not in contact with the control conductor assembly, an interlock armor disposed over the core and the second ground conductor such that the second ground conductor is maintained in contact with the interlock armor.

Further, according to an embodiment of the present disclosure, there is provided a method of assembling the metal clad cable. The method includes assembling a first ground conductor, a phase conductor and a neutral conductor adjacent to each other, positioning a control conductor assembly in a valley between the neutral conductor and the phase conductor, wrapping a binder tape around the first conductor, the phase conductor, the neutral conductor, and the control conductor assembly forming a core, positioning a second ground conductor outside the binder tape of the core and spaced away from the control conductor assembly, and covering the core and the second ground conductor with an interlock armor ensuring the second ground conductor is in contact with the interlock armor along the length of the metal clad cable.

Positioning the second ground conductor away from the control conductor assembly allows the second ground conductor to maintain contact with the interlock armor. The control conductor assembly is the largest diameter component of the metal clad cable, so the second ground conductor is positioned away from this pair so that the second ground conductor can maintain the largest individual diameter compared to other individual conductors. Furthermore, the second ground conductor can provide additional protection during ground fault conditions, reducing the risk of faulting to control conductors that can be unprotected from fault currents. Additionally, placing the second ground conductor away from the conductor assembly can minimize the impact of electrical noise on the control conductor assembly. The electrical noise can be caused due to stray currents that may occur in the bonding conductor.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
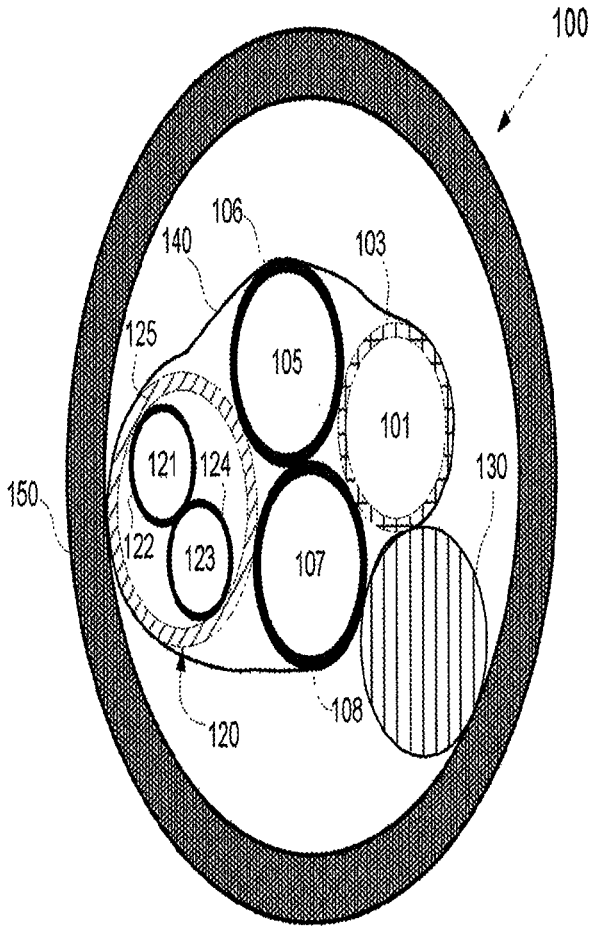
FIG. 1 is a cross-section view of a MC-PCS-HCF cable according to an exemplary embodiment of the present disclosure.

FIG. 1 is a cross-section view of a MC-PCS-HCF cable according to an exemplary embodiment of the present disclosure. The acronyms MC stands for metal-clad, PCS stands for power and control or signal, and HCF stands for healthcare facility. The MC-PCS-HCF cable 100 is constructed from a plurality of cables (or wires) that are assembled together in a covering. The MC-PCS-HCF cable 100 construction includes a first ground conductor 101 covered in a first insulation 103, a phase conductor 105 covered in a second insulation 106, a neutral conductor covered in a third insulation 108 respectively, a control conductor assembly 120, and a second ground conductor 130 that are assembled within a interlocked armor 150. The control conductor assembly 120 includes two conductors 121 and 123 covered in a fourth insulation 122 and a fifth insulation 124 that are assembled together within a sixth insulation 125. The pair constitutes a control or signal cable, where conductor 121 can be positive and conductor 123 can be negative. The phase conductor 105 and neutral conductor 107 transmit line voltage (up to 600V) power from an energy source to the device and the control conductors 121 and 123 transmit the control or signal voltage (up to 300V).

The first ground conductor 101, the phase conductor 105, the neutral conductor 107, and the control conductor assembly 120 are assembled together and wrapped in a binder tape 140 forming a core of the MC-PCS-HCF cable 100. The second ground conductor 130 is located outside the binder tape 140 and remains in contact with the interlocked armor 150 throughout. The second ground conductor 130 acts as a redundant grounding source that grounds the noncurrent-carrying metal parts of frames and enclosures making up an electrical system. The ground conductors provide a low-impedance path back to an energy source to prevent hazardous voltages from appearing on equipment.

In one embodiment, each of the conductors of the MC-PCS-HCF cable 100 can be of different size and shape, and made of different conducting materials such as copper (Cu), aluminum (Al), nickel or a combination thereof. For example, the cable size can vary from 6 AWG to 18 AWG (American wire gauge) and can be cylindrical, trapezoidal, square, rectangular, triangular, or other geometrical shape. In an exemplary embodiment of the present disclosure, the first ground conductor 101 can be of sizes up to 6 AWG and are cylindrical wires made of copper. While, the control conductors 121 and 123 are cylindrical copper wire of size up to 16 AWG. The second ground conductor 130 made from aluminum is cylindrical in shape, however, the second ground conductor 130 can be trapezoidal, rectangular, triangular, or other geometric shape that enables the second ground conductor 130 to maintain a contact with the interlocking armor 150. The second ground conductor 130 can have a size greater than or significantly equal to the first ground conductor 101, the phase conductor 105, and the neutral conductor 107.

The insulations covering different conductors can be made of different insulation material having a temperature rating, and a condition of use (e.g., wet locations). For example, the insulation can be of type THWN (Thermoplastic Heat and Water-resistant Nylon), THHN (Thermoplastic High Heat-resistant Nylon) or TFN (Thermoplastic Fixture Wire Nylon), which can be in a solid or a stranded form. Further, the insulations can be color-coded (e.g., green, yellow, grey, red, blue, black, etc.) for identification. In an exemplary embodiment of the present disclosure, the first insulation 103 is THHN and is color-coded in green to identify the ground conductor 101. The second insulation 106 and third insulation 108 are color-coded in black and white, respectively, to identify the phase conductor 105 and the neutral conductor 107, respectively. The sixth insulation 125 can be PVC (polyvinyl chloride) and color-coded in blue to identify the control conductor assembly 120. The sixth insulation 125 provides an appropriate separation distance between a class 2 or a class 3 type conductor such as the control or signal conductors 121 and 123, and class 1 type conductors such as the phase conductor 105, the neutral conductor 107 and the first ground 101. The sixth insulation 125 provides a continuous and permanent separation between the class 1 and class 2 or class 3 type conductors. The binder tape 140 over the conductor assembly is preferably composed of polyester (Mylar) or polypropylene, but may be composed of any of a variety of materials as allowed in UL 1569.

In one embodiment, the conductors 101, 105, and 107 can be of similar sizes. Further, the control conductors 121 and 123 can of similar size and proximately smaller than the conductors 101, 105 or 107. However, when the control conductors 121 and 123 are assembled together to form the control conductor assembly 120, the size of the control conductor assembly 120 can be greater than the conductors 101, 105, or 107. The differences in the sizes of the conductors create non-uniform valleys between the different conductors. Also, a non-uniform spacing is created between the interlocking armor and the conductors. As such, installation of the second ground conductor 130 such that the second ground conductor 130 remains in contact with the interlocking armor 150 throughout the lay becomes tricky. In addition, the binder tape 140 wrapped around the conductors reduces the amount of space available for installing the second ground conductor 130. Also, it is required that the second ground conductor 130 be larger than the conductors, particularly when the class 1 conductors are assembled together with the class 2 or class 3 conductors to meet the National Electrical Code NEC® requirements. As such, the second ground conductor 130 can be installed between the valley created between the conductor 101 and 105 or between conductors 101 and 107. Such an arrangement of the conductors can make the MC-PCS-HCF cable 100 compact, and cost effective.

The larger size of the control conductor assembly 120 reduces the amount of space between the conductors 120 and 105 or between the conductors 120 and 107. The amount of space is further reduced by the binder tape 140 covering the valley between the conductors 120 and 105, and the conductors 120 and 107. As such, installation of the second ground conductor 130 next to the control conductor assembly 120 may require a larger sized interlocking armor 150, thus increasing the cost and size of the MC-PCS-HCF cable 100. In addition, the reliability of the MC-PCS-HCF cable 100 may be reduced In another embodiment, the interlocking armor 150 can be oval in shape to install the second ground 130 touching the control conductor assembly 120. However, an oval shaped interlocking armor 150 may increase the cost of manufacturing, and the installation of second ground conductor 130 may lower the reliability of the MC-PCS-HCF cable 100.

Figure 5:
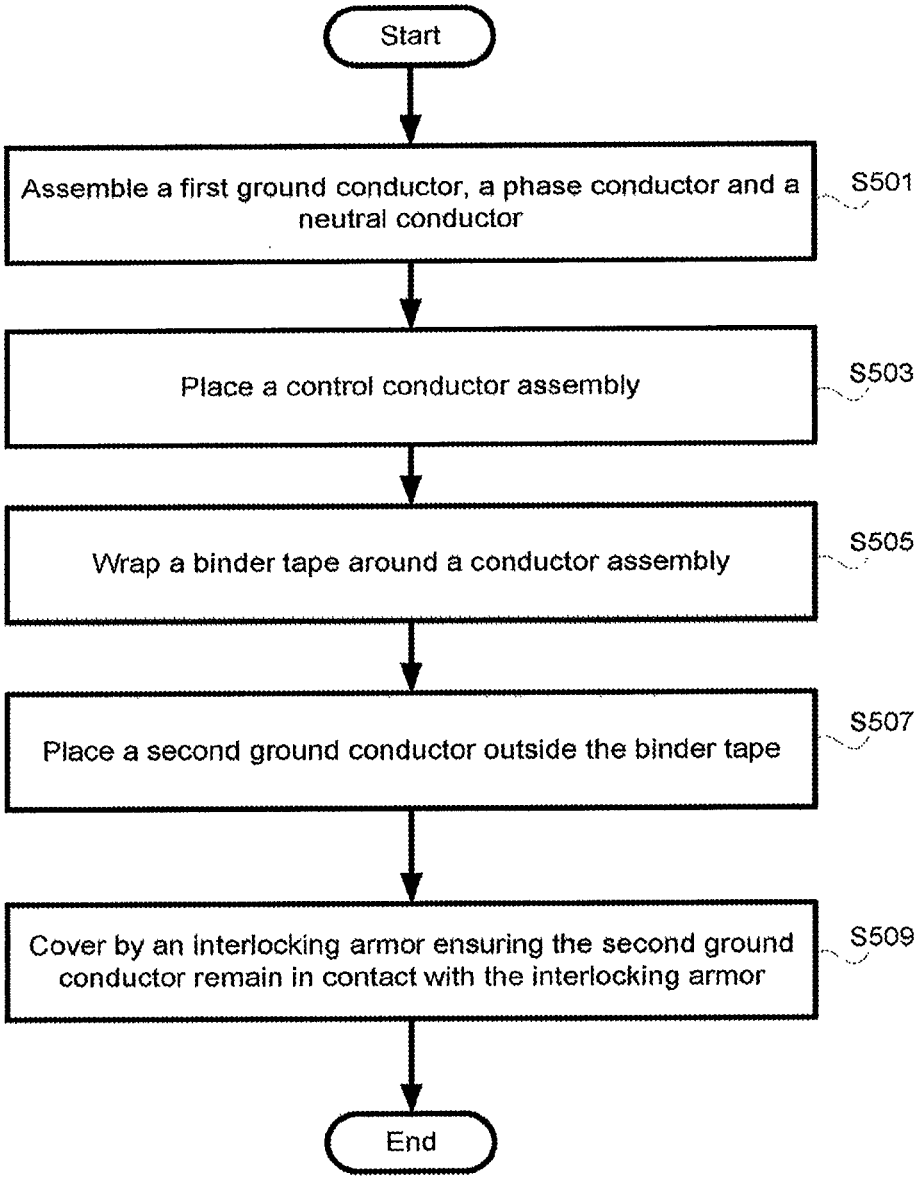
FIG. 5 is flow chart of a exemplary manufacturing process for the MC-PCS-HCF cable according to an exemplary embodiment of the present disclosure.

The MC-PCS-HCF cable 100 can be manufactured in several ways. Referring to FIG. 5, in step S501, the insulated conductors 101, 105, and 107 can be assembled together and, in step S503, the control conductor assembly 120 can be placed between a valley created between the conductors 101 and 105, or 101 and 107, or 105 and 107. In step 505, the binder tape 140 can be tightly wrapped around the conductor assembly of the four conductors 101, 105, 107, and 120 to hold the four conductors 101, 105, 107, and 120 together. In step S507, the second ground conductor 130 can be placed outside the binder tape 140 between the valley of the conductors 101 and 105, 101 and 107, or 105 and 107 and preferably not touching the control conductor assembly 120 providing additional protection during ground fault conditions, and reducing the risk of faulting to control cables that are unprotected from fault currents. In step S509, the assembly of the four conductors wrapped in the binder tape 140 and the second ground conductor 130 can be placed inside the interlocking armor 150 ensuring the second ground conductor 130 remain in contact with the interlocking armor 150. That is, in step S509 maintaining the second ground conductor's position as the highest component of the cable forcing the second ground conductor to maintain contact with the armor. Also, placing the second ground conductor 130 away from the conductor assembly 120 can minimize the impact of electrical noise on the control conductor assembly 120. The electrical noise can be caused due to stray currents that may occur in the bonding conductor. The conductor assembly is fed into an armoring machine, where metal tape is helically applied around the conductor assembly to form an interlocked armor.

As a consequence of the position of the second ground conductor, accessing the second ground conductor can be readily accomplished while terminating, and the second ground conductor can be readily identified and separated from the cable in order to cut it. Thus, there is less risk to damage the control conductor assembly as well.

In one embodiment, the assembly of the four conductors wrapped in the binder tape 140 and the second ground conductor 130 can be twisted before placing covering with the interlocking armor 150. In another embodiment, the assembly of the four conductors wrapped in the binder tape 140 can be twisted, and the second ground conductor 130 can be layed straight outside the binder tape 140 without twisting. Alternatively, the conductor 101, 105, and 107 can be twisted, the control conductor 120 can be layed straight without twisting, as well as the second ground conductor 130 can be layed straight outside the binder tape 140 without twisting.

Figure 4:
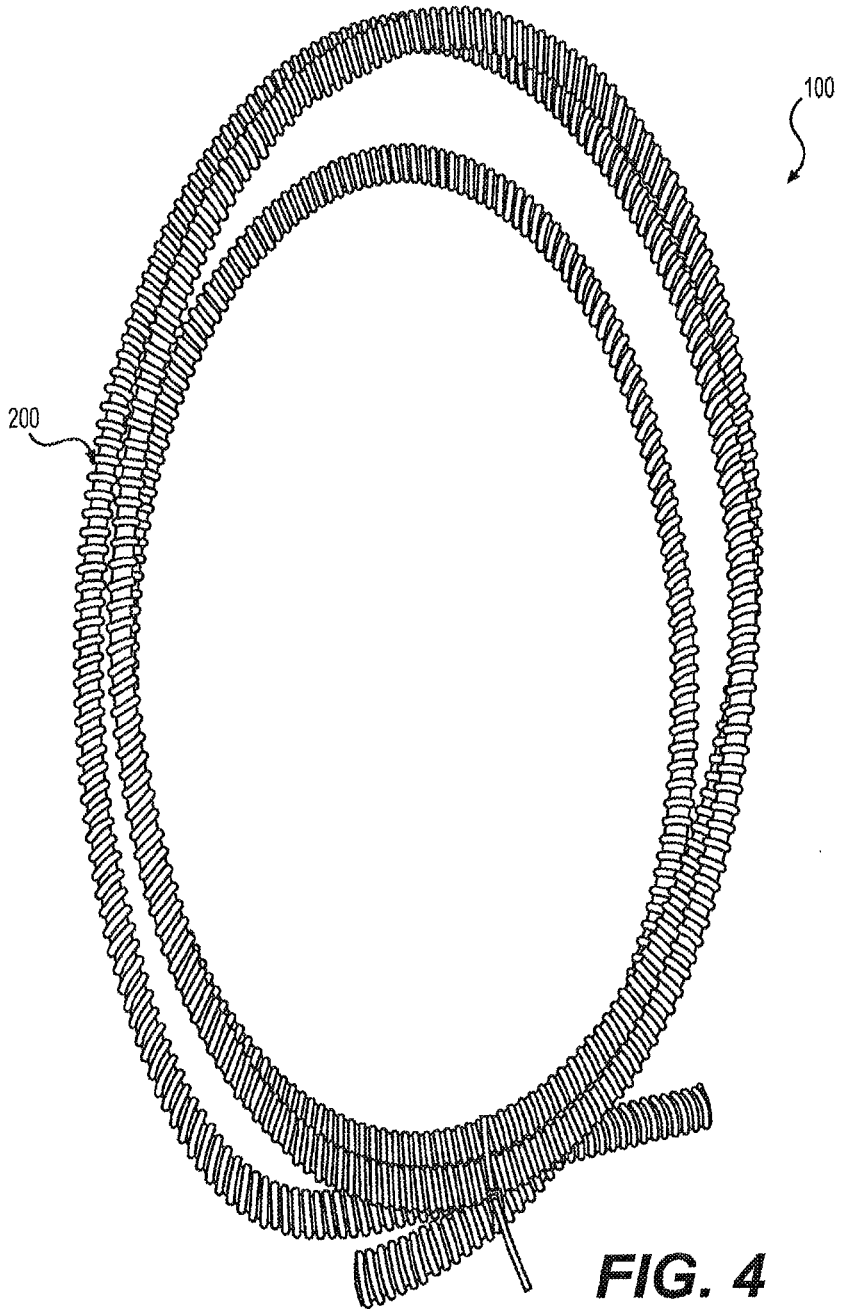
FIG. 4 is an image the MC-PCS-HCF cable in a wound state according to an exemplary embodiment of the present disclosure.

The interlocking armor 150 is made of aluminum or steel which provides a robust armor ground path and maintains a light weight construction. The interlocking armor 150 provides mechanical protection to the electrical cables assembled within the interlocking armor 150. Further, interlocking armor 150 is flexible and easy to install especially bending around corners, refer FIG. 4. In FIG. 4, the interlocking armor 150 also includes yellow strips (indicia 200) at certain distance. The yellow strip can further contain circuit identification indicia (e.g., print). In another embodiment, the interlocking armor 150 can be coated with an overall PVC (polyvinyl chloride) jacket.

Thus, the exemplary MC-PCS-HCF 100 cable is constructed with 12 AWG or 10 AWG Cu Type THHN/THWN phase and neutral conductors 105 and 107, respectively, and ground conductor 101 along with a control conductor assembly 120 composed of a PVC (polyvinyl chloride) jacket covering two 16 AWG Cu Type TFN control conductors. The MC-PCS used for LED lighting with dimming control applications can have a 16 AWG control cable with two wires. The MC-PCS constructions used for other applications may have different control cables with different sizes and numbers of conductors. The phase conductor 105 and the neutral conductors 107, the insulated green ground (i.e., the first ground conductor 101), and the control conductor assembly 120 are cabled together and the binder tape 140 that can have a print legend (not shown) is wrapped around the assembly. A bare aluminum grounding/bonding conductor (i.e., the second ground conductor 130) is located outside the binder tape 140 covering and has the same lay as the insulated conductors. A green colored aluminum interlocking armor (i.e., interlocking armor 150) is applied over the taped assembly. Yellow stripe/blocks are printed on the outside of the interlocking armor 150 and a print for identifying a circuit is applied on every fourth yellow stripe/block.

Figure 2:
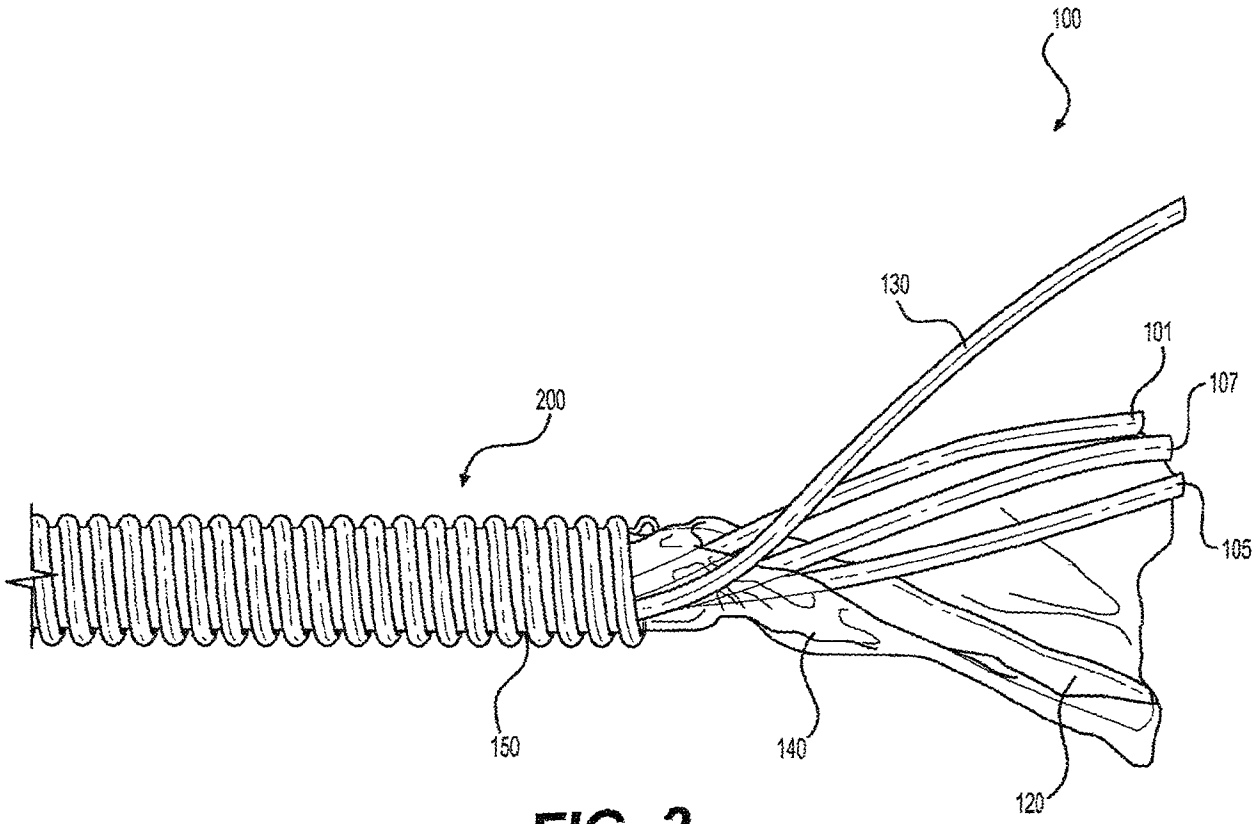
FIG. 2 is an image the MC-PCS-HCF cable showing internal wires according to an exemplary embodiment of the present disclosure.
Figure 3:
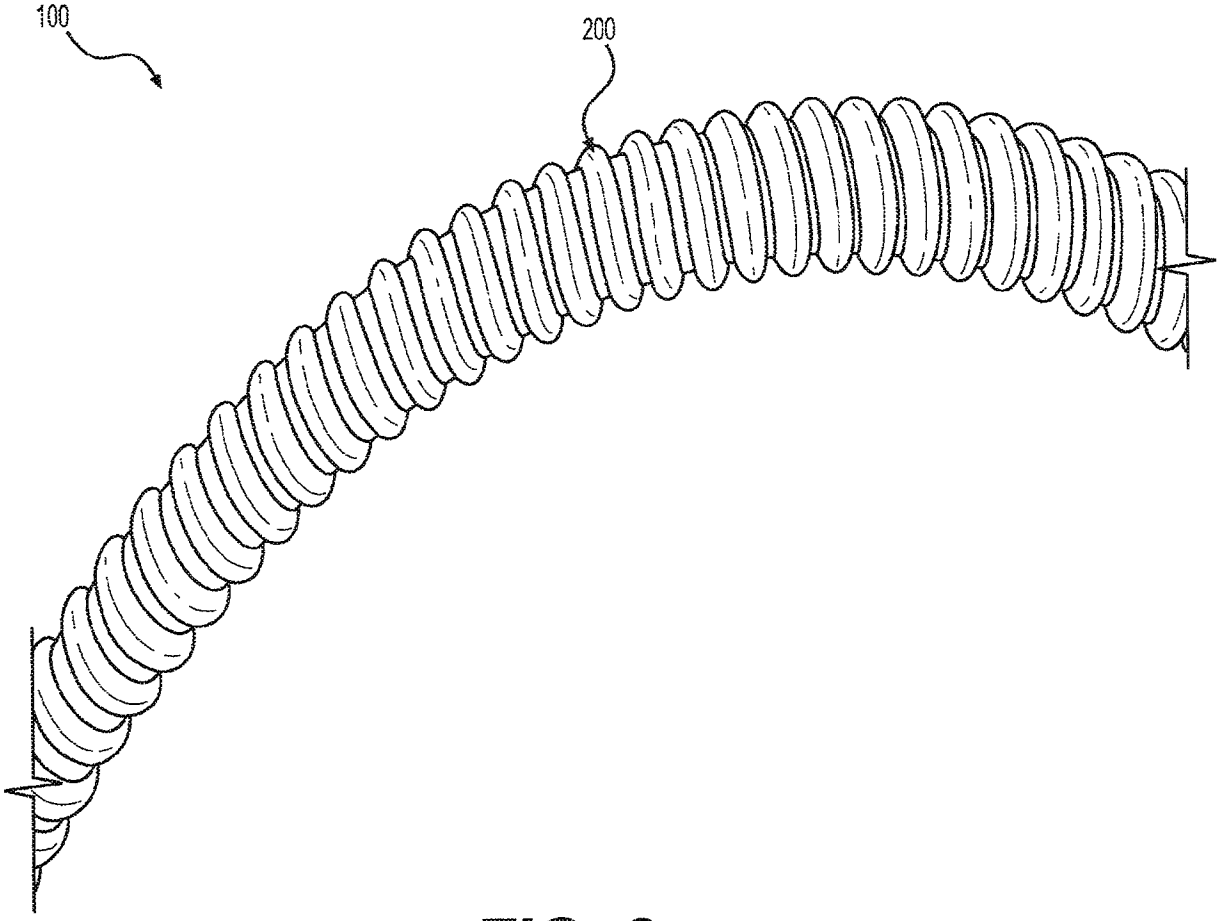
FIG. 3 is an image the MC-PCS-HCF cable showing indicia according to an exemplary embodiment of the present disclosure.

FIG. 2 is an image the MC-PCS-HCF cable showing internal wires according to an exemplary embodiment of the present disclosure. In FIG. 2, interlocking armor 150 of the MC-PCS-HCF cable 100 is cut to expose internal wires including the first ground conductor 101, the phase conductor 105, the neutral conductors 107, and the control conductor assembly 120 that are wrapped in the binder tape 140 and the second ground conductor 130 located outside the binder tape 140 touching the interlocking armor 150. The interlocking armor 150 also includes an indicia 200, which can be an alpha-numeric code printed directly on the interlocking armor 150 for circuit identification. The indicia 200 are further also illustrated in FIG. 3. The indicia 200 can be a yellow strip printed outside the interlocking armor 150 that can include circuit identifying print. For example, the circuit identification characters include cable type MC-PCS-HCF, the conductor size and number indicator (e.g., 12/2, and 16/2), and color indicators BLK (for black), WHT (for white) etc. The indicia 200 can be printed with the circuit identifying mark on every fourth (for example) yellow strip.

The MC-PCS-HCF cable 100 has a voltage rating of up to 600 Volts and includes copper power & control or signal conductors that are THHN, THWN or TFN insulated, a green insulated grounding conductor, or a full-sized aluminum grounding conductor. The MC-PCS-HCF cable 100 can be rated VW-1 and rated for up to 90° C. dry locations.

The MC-PCS-HCF cable 100 has several features including being in full compliance with NEC 330, NEC 725, and UL (Underwriters Laboratories) 1569. There exists a redundant ground path for patient care areas per NEC 517.13(A) & (B). The MC-PCS-HCF cable 100 provides a simplified armored product application and installation. The armor ground path is approximately 3.5 times better than Type AC HCF Cable and is equivalent to a green insulated copper grounding conductor. The MC-PCS-HCF cable 100 can be packaged in coils, reels, barrels, boxes, or prefab assemblies. Further, the MC-PCS-HCF cable 100 can be provided with steel armor, an overall PVC (Polyvinyl Chloride) jacket, and multi-neutral and multi-circuit configurations. The MC-PCS-HCF cable 100 can be used in UL Classified 1, 2, and 3 hour through penetration firestop systems: W-J-3037, W-L-3110, W-L-3113, W-L-3117, W-L-3120, W-L-3121, W-L-3160, C-AJ-3115, C-AJ-3140, C-AJ-3142, C-AJ-3145, C-AJ-3173, C-AJ-3202, C-AJ-4065, C-AJ-4066, F-C-3038. The MC-PCS-HCF cable 100 can be reverse wound on reel for ease of pulling and installation.

The MC-PCS-HCF cable 100 has several applications including but not limited to: branch-circuit wiring for general purpose, non-essential electrical systems in patient care areas of hospitals, medical and other health care facilities. Such areas include nursing homes, dental offices, and outpatient facilities. Further, MC-PCS-HCF cable 100 can be used for power, lighting, control, and signal circuits requiring redundant, dedicated, or isolated grounding paths. The MC-PCS-HCF cable 100 can be fished or embedded in plaster, can be used for concealed or exposed installations, used in environmental air-handling spaces per NEC 300.22 (C) and places of assembly per NEC 518.4 and theaters per NEC 520.5. The MC-PCS-HCF cable 100 can be installed in cable tray and approved raceways. The MC-PCS-HCF cable 100 can also be used under raised floors for information technology equipment conductors and cables per NEC 645.5 (D) & 645.5(D)(2) and Class I Div. 2, Class II Div. 2, & Class III Div. 1 hazardous locations.

The MC-PCS-HCF cable 100 meets or exceeds the requirements of: UL 83; UL 1569 (Including new Sections 9.4, 40.1(q), and 41.1(r) as detailed in the latest UL 1569 CRD); UL 1685; Federal Specification A-A59544 (formerly J-C-30B); National Electrical Code (NFPA 70) (Specifically NEC 725.136(I)(1) & (2) as described in the latest UL 1569 CRD); listed for use in UL 1, 2 and 3 hour through penetration firestop systems; and passes both "UL Test" & "FT4/IEEE 1202" (70,000 Btu/hr) vertical cable tray flame test.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel apparatuses described herein can be embodied in a variety of other forms; furthermore, various omissions, substitutions and changes in the form of the apparatuses and systems described herein can be made without departing from the spirit of the present disclosures.

What is claimed is:

1. A metal clad cable, comprising:

a first ground conductor having a first diameter;

a phase conductor or neutral conductor positioned adjacent to the first ground conductor and in contact with the first *ground* conductor;

a control conductor assembly including a first control conductor and a second control conductor, wherein the control conductor assembly is positioned away from direct contact with any valley at least partially formed by a second ground conductor having a second diameter positioned outside a binder tape of a core, and the control conductor assembly, the first ground conductor, the phase conductor, and the neutral conductor are wrapped in the binder tape to form the core; *and* the second ground conductor having the second diameter positioned outside the binder tape of the core *and maintaining contact with an interlocked armor*, the second ground conductor being located relative to the control conductor assembly such that the second ground conductor is not in contact with the control conductor *assembly and the second ground conductor maintains a largest individual diameter compared to a diameter of other individual conductors*;

[an] *wherein the* interlock armor *is* disposed over the core and the second ground conductor such that the second ground conductor is maintained in contact with the interlock armor*, and*

*the second diameter of the second ground conductor is greater than the first diameter of the first ground conductor where the first diameter of the first ground conductor includes concentric surrounding layers,*

*wherein the first ground conductor comprises the first ground conductor and a single insulator*.

[2. The metal clad cable according to claim 1, wherein the second diameter of the second ground conductor is greater than the first diameter of the first ground conductor.]

3. The metal clad cable according to claim 1, wherein the second ground conductor is located in a valley between the first ground conductor and the neutral conductor.

4. The metal clad cable according to claim 1, wherein the second ground conductor is located in a valley between the first ground conductor and the phase conductor.

5. The metal clad cable according to claim 1, wherein the interlock armor has a circular or an oval cross-section.

6. The metal clad cable according to claim 5, wherein the interlock armor includes identification indicia on a circumference of the interlock armor.

7. The metal clad cable according to claim 6, wherein the indicia indicates a circuit type.

8. The metal clad cable assembly according to claim 1, where the core comprises a set of conductors each configured to operate as class 2 or class 3 circuit conductors in accordance with Article 725 of the National Electrical Code®.

9. A method of assembling a metal clad cable, the method comprising:

assembling a first ground conductor adjacent to and in contact with a phase conductor or a neutral conductor positioning a control conductor assembly away from direct contact with any valley at least partially formed by a second ground conductor having a second diameter that is to be positioned outside a binder tape of a core;

wrapping the binder tape around the first ground conductor, the phase conductor, the neutral conductor, and the control conductor assembly to form the core;

positioning the second ground conductor outside the binder tape of the core and spaced away from the control conductor assembly; and covering the core and the second ground conductor with an interlock armor ensuring the second ground conductor is in contact with the interlock armor along a length of the metal clad cable,

*wherein the first ground conductor consists of the first ground conductor and a single insulator*.

10. The method according to claim 9, wherein the second ground conductor is located in a valley between the first ground conductor and the neutral conductor.

11. The method according to claim 9, wherein the second ground conductor is located in a valley between the first ground conductor and the phase conductor.

*12. The metal clad cable assembly according to claim 1, wherein the metal clad cable is configured for use in a health care facility (HCF cable).*

*13. A metal clad cable comprising:*

*a first ground conductor having a first diameter:*

*a phase conductor or neutral conductor positioned adjacent to the first ground conductor and in contact with the first ground conductor;*

*a control conductor assembly including a first control conductor and a second control conductor, wherein the control conductor assembly is positioned away from direct contact with an valley at least partially formed by a second ground conductor having a second diameter;*

*the second ground conductor being located relative to the control conductor assembly such that the second ground conductor is not in contact with the control conductor assembly;*

*an interlock armor disposed over the first ground conductor, the phase conductor, the neutral conductor, the control conductor assembly, and the second ground conductor such that the second ground conductor is maintained in contact with the interlock armor and the second ground conductor maintains a largest individual diameter compared to a diameter of other individual conductors,*

*wherein the second diameter of the second ground conductor is greater than the first diameter of the first ground conductor and the first diameter of the first ground conductor includes concentric surrounding layers, and*

*wherein the first ground conductor comprises the first ground conductor and a single insulator.*

*14. The metal clad cable according to claim 18, wherein the interlock armor includes identification indicia on a circumference of the interlock armor.*

*15. The metal clad cable according to claim 14, wherein the indicia indicates a circuit type.*

*16. The metal clad cable according to claim 13, wherein the second ground conductor is located in a valley between the first ground conductor and the neutral conductor.*

*17. The metal clad cable according to claim 13, wherein the second ground conductor is located in a valley between the first ground conductor and the phase conductor.*

*18. The metal clad cable according to claim 13, wherein the interlock armor has a circular or an oval cross-section.*

*19. The metal clad assembly according to claim 13, wherein the control conductor assembly comprises a set of conductors each configured to operate as class 2 or class 3 circuit conductors in accordance with Article 725 of the National Electrical Code®.*

*20. A method of assembling a metal clad cable, the method comprising:*

*assembling a first ground conductor having a first diameter adjacent to and in contact with a phase conductor or a neutral conductor;*

*positioning a control conductor assembly away from direct contact with any valley at least partially formed by a second ground conductor having a second diameter;*

*positioning the second ground conductor spaced away from the control conductor assembly; and*

*covering the control conductor assembly, the first ground conductor, the phase conductor, the neutral conductor*

*and the second ground conductor with an interlock armor to ensure the second ground conductor is in contact with the interlock armor along a length of the metal clad cable,*

*wherein the second diameter of the second ground conductor is greater than the first diameter of the first ground conductor and the first diameter of the first ground conductor includes concentric surrounding layers,*

*wherein the second ground conductor maintains a largest individual diameter compared to a diameter of other individual conductors, and*

*wherein the first ground conductor comprises of the first ground conductor and a single insulator.*

* * * * *